(12) United States Patent
Porter

(10) Patent No.: US 7,846,278 B2
(45) Date of Patent: Dec. 7, 2010

(54) METHODS OF MAKING SMOOTH REINFORCED CEMENTITIOUS BOARDS

(75) Inventor: John Frederick Porter, St. Catharines (CA)

(73) Assignee: Saint-Gobain Technical Fabrics America, Inc., Grand Island, NY (US)

( * ) Notice: Subject to any disclaimer, the term of this patent is extended or adjusted under 35 U.S.C. 154(b) by 0 days.

(21) Appl. No.: 10/696,751

(22) Filed: Oct. 29, 2003

(65) Prior Publication Data

US 2004/0084127 A1    May 6, 2004

Related U.S. Application Data

(60) Continuation of application No. 10/155,650, filed on May 23, 2002, now abandoned, which is a division of application No. 09/478,129, filed on Jan. 5, 2000, now abandoned.

(51) Int. Cl.
*B32B 37/24*    (2006.01)
(52) U.S. Cl. .............................. 156/39; 156/44; 156/319
(58) Field of Classification Search .................. 156/39, 156/44, 281, 319
See application file for complete search history.

(56) References Cited

U.S. PATENT DOCUMENTS

| | | |
|---|---|---|
| 1,439,954 A | 12/1922 | Emerson |
| 1,787,163 A | 12/1930 | New |
| 1,805,840 A | 5/1931 | New |
| 1,808,003 A | 6/1931 | New |
| 1,975,787 A | 10/1934 | Hansen |
| 2,206,042 A | 7/1940 | Novak |
| 2,208,232 A | 7/1940 | Smolak |
| 2,238,017 A | 4/1941 | Duncan |
| 2,432,963 A | 12/1947 | Camp |
| 2,464,759 A | 3/1949 | Camp |
| 2,483,806 A | 10/1949 | Buckley |

(Continued)

FOREIGN PATENT DOCUMENTS

AU    B-34994/89    5/1991

(Continued)

OTHER PUBLICATIONS

Translation for Japan 53-119344 (May 2007).*

(Continued)

*Primary Examiner*—Steven D Maki
(74) *Attorney, Agent, or Firm*—Duane Morris LLP

(57) ABSTRACT

A composite fabric for use in reinforcement of cementitious boards and similar prefabricated building wall panels. The fabric includes an open mesh first component of continuously coated, high modulus of elasticity strands and a nonwoven second component fabricated from alkali resistant thermoplastic material. The high modulus strands of the first component are preferably bundled glass fibers encapsulated by alkali and water resistant thermoplastic material. The composite fabric also has suitable physical characteristics for embedment within the cement matrix of the panels or boards closely adjacent the opposed faces thereof. The reinforcement provides long-lasting, high strength tensile reinforcement and impact resistance for the panels or boards. The reinforcement also enables the boards to have smooth outer faces suitable for painting, papering, tiling or other finishing treatment. Included as part of the invention are methods for making the reinforcement, cementitious boards and panels including the reinforcement, and methods for manufacturing such boards and panels.

7 Claims, 1 Drawing Sheet

U.S. PATENT DOCUMENTS

| | | | |
|---|---|---|---|
| 2,526,066 A | 10/1950 | Croce | |
| 2,560,521 A | 7/1951 | Camp | |
| 2,597,901 A | 5/1952 | Riddell et al. | |
| 2,610,130 A | 9/1952 | Riddell et al. | |
| 2,633,441 A | 3/1953 | Buttress | |
| 2,681,863 A | 6/1954 | Croce et al. | |
| 2,744,022 A | 5/1956 | Croce et al. | |
| 2,902,395 A | 9/1959 | Hirschy et al. | 154/46 |
| 2,954,302 A | 9/1960 | Gorman, Jr. | |
| 3,185,297 A | 5/1965 | Rutledge | |
| 3,214,289 A | 10/1965 | Lefebvre | 117/122 |
| 3,284,980 A | 11/1966 | Dinkel | |
| 3,289,371 A | 12/1966 | Pearson et al. | |
| 3,333,974 A | 8/1967 | Sherr | |
| 3,391,037 A | 7/1968 | McNulty | |
| 3,454,456 A | 7/1969 | Willey | |
| 3,455,710 A | 7/1969 | Nitzsche et al. | |
| 3,516,882 A | 6/1970 | Cummisford | |
| 3,607,486 A | 9/1971 | Jacks et al. | |
| 3,616,173 A | 10/1971 | Green et al. | 161/162 |
| 3,623,895 A | 11/1971 | Nitzsche et al. | 106/2 |
| 3,666,581 A | 5/1972 | Lane | |
| 3,766,003 A | 10/1973 | Schuller et al. | |
| 3,788,271 A | 1/1974 | Carpenter et al. | 118/33 |
| 3,830,687 A | 8/1974 | Re et al. | |
| 3,903,879 A * | 9/1975 | Riley et al. | 442/187 |
| 3,918,230 A | 11/1975 | Carroll | |
| 3,929,947 A | 12/1975 | Schwartz et al. | |
| 3,935,021 A | 1/1976 | Greve et al. | |
| 3,941,632 A | 3/1976 | Swedenberg et al. | |
| 3,944,698 A | 3/1976 | Dierks et al. | |
| 3,947,398 A | 3/1976 | Williams | |
| 3,964,944 A | 6/1976 | Gwynne | |
| 3,971,184 A | 7/1976 | Van Wagoner | |
| 3,993,822 A | 11/1976 | Knauf et al. | 428/213 |
| 4,020,237 A | 4/1977 | von Hazmburg | |
| 4,047,355 A | 9/1977 | Knorr | |
| 4,048,364 A | 9/1977 | Harding et al. | 428/113 |
| 4,064,306 A | 12/1977 | Scotchmer et al. | 428/255 |
| 4,065,333 A | 12/1977 | Lawlis et al. | |
| 4,065,597 A | 12/1977 | Gillespie | |
| 4,067,939 A | 1/1978 | Lowe et al. | |
| 4,073,997 A | 2/1978 | Richards et al. | |
| 4,087,577 A | 5/1978 | Hendrickson | 428/110 |
| 4,094,694 A | 6/1978 | Long | |
| 4,112,174 A | 9/1978 | Hannes et al. | |
| 4,117,686 A | 10/1978 | Hilfiker | 405/284 |
| 4,127,628 A | 11/1978 | Uchida et al. | |
| 4,128,699 A | 12/1978 | Kole et al. | |
| 4,135,029 A | 1/1979 | Pfeffer | |
| 4,148,781 A | 4/1979 | Narukawa et al. | |
| 4,152,878 A | 5/1979 | Balinski | |
| 4,181,767 A | 1/1980 | Steinau | |
| 4,187,130 A | 2/1980 | Kautz | |
| 4,195,110 A | 3/1980 | Dierks et al. | 428/218 |
| 4,203,788 A | 5/1980 | Clear | |
| 4,229,497 A * | 10/1980 | Piazza | 428/71 |
| 4,238,445 A | 12/1980 | Stone | |
| 4,242,406 A | 12/1980 | El Bouhnini et al. | |
| 4,242,779 A | 1/1981 | Curinier et al. | 28/101 |
| 4,252,568 A | 2/1981 | Bounini | |
| 4,265,979 A | 5/1981 | Baehr et al. | |
| 4,273,476 A | 6/1981 | Kotulla et al. | 405/258 |
| 4,275,105 A | 6/1981 | Boyd et al. | |
| 4,296,169 A | 10/1981 | Shannon | |
| 4,302,495 A | 11/1981 | Marra | 428/110 |
| 4,303,722 A | 12/1981 | Pilgrim | 428/213 |
| 4,324,082 A | 4/1982 | Rutkowski et al. | |
| 4,335,177 A | 6/1982 | Takeuchi | |
| 4,340,558 A | 7/1982 | Hendrickson | 264/151 |
| 4,341,560 A | 7/1982 | Saito et al. | |
| 4,344,804 A | 8/1982 | Bijen et al. | |
| 4,344,910 A | 8/1982 | Bijen | |
| 4,345,037 A | 8/1982 | Fyles et al. | |
| 4,351,867 A | 9/1982 | Mulvey et al. | |
| 4,361,613 A | 11/1982 | Bogner et al. | 428/119 |
| 4,361,616 A | 11/1982 | Bomers | |
| 4,364,212 A | 12/1982 | Pearson et al. | |
| 4,378,405 A | 3/1983 | Pilgrim | 428/322 |
| 4,403,006 A | 9/1983 | Bruce et al. | |
| 4,411,701 A | 10/1983 | Saito et al. | |
| 4,420,524 A | 12/1983 | Gorgati | |
| 4,421,704 A | 12/1983 | Reily | |
| 4,449,336 A | 5/1984 | Kelly | |
| 4,450,022 A * | 5/1984 | Galer | 156/42 |
| 4,472,086 A | 9/1984 | Leach | 405/258 |
| 4,477,300 A | 10/1984 | Pilgrim | 156/44 |
| 4,491,617 A | 1/1985 | O'Connor et al. | |
| 4,494,990 A | 1/1985 | Harris | 106/90 |
| 4,504,335 A | 3/1985 | Galer | |
| 4,504,533 A | 3/1985 | Altenhofer et al. | 428/70 |
| 4,506,060 A | 3/1985 | White, Sr. et al. | |
| 4,518,652 A | 5/1985 | Willoughby | |
| 4,537,610 A | 8/1985 | Armstrong et al. | |
| 4,539,249 A * | 9/1985 | Curzio | 428/175 |
| 4,564,544 A | 1/1986 | Burkard et al. | 428/70 |
| 4,571,356 A | 2/1986 | White, Sr. et al. | |
| 4,578,301 A | 3/1986 | Currie et al. | 428/109 |
| 4,610,915 A | 9/1986 | Crenshaw et al. | |
| 4,616,959 A | 10/1986 | Hilfiker | 405/286 |
| 4,617,219 A | 10/1986 | Schupack | |
| 4,637,951 A | 1/1987 | Gill et al. | |
| 4,640,864 A | 2/1987 | Porter | 428/334 |
| 4,643,119 A | 2/1987 | Langston et al. | 112/421 |
| 4,643,771 A | 2/1987 | Steinbach et al. | |
| 4,647,496 A | 3/1987 | Lehnert et al. | 428/251 |
| 4,664,707 A | 5/1987 | Wilson et al. | |
| 4,681,802 A | 7/1987 | Gaa et al. | |
| 4,699,542 A | 10/1987 | Shoesmith | |
| 4,706,430 A * | 11/1987 | Sugita et al. | 52/309.16 |
| 4,722,866 A | 2/1988 | Wilson et al. | |
| 4,736,561 A | 4/1988 | Lehr et al. | |
| 4,753,840 A | 6/1988 | Van Gompel | |
| 4,762,750 A | 8/1988 | Girgis et al. | |
| 4,778,700 A | 10/1988 | Pereira | 428/40 |
| 4,783,942 A | 11/1988 | Nunley et al. | |
| 4,793,892 A | 12/1988 | Miller et al. | |
| 4,810,569 A | 3/1989 | Lehnert et al. | 428/285 |
| 4,810,576 A | 3/1989 | Gaa et al. | |
| 4,811,538 A | 3/1989 | Lehnert et al. | |
| 4,816,091 A | 3/1989 | Miller | |
| 4,856,939 A | 8/1989 | Hilfiker | 405/284 |
| 4,879,173 A | 11/1989 | Randall | 428/285 |
| 4,910,064 A | 3/1990 | Sabee | 428/113 |
| 4,948,647 A | 8/1990 | Burkard | 428/70 |
| 4,957,390 A | 9/1990 | Shoesmith et al. | |
| 4,967,548 A | 11/1990 | Fangeat et al. | |
| 4,992,003 A | 2/1991 | Perach | 405/258 |
| 5,011,523 A | 4/1991 | Roncato et al. | |
| 5,030,502 A | 7/1991 | Teare | |
| 5,079,078 A | 1/1992 | Jutte, Jr. et al. | 428/251 |
| 5,091,247 A | 2/1992 | Willibey et al. | 428/255 |
| 5,108,224 A | 4/1992 | Cabaniss et al. | 405/52 |
| 5,110,627 A | 5/1992 | Shoesmith et al. | |
| 5,112,678 A | 5/1992 | Gay et al. | 428/268 |
| 5,135,805 A | 8/1992 | Sellers et al. | 428/302 |
| 5,139,841 A | 8/1992 | Makoui et al. | 428/109 |
| 5,148,645 A | 9/1992 | Lehnert et al. | 52/443 |
| 5,161,917 A | 11/1992 | Papetti | 405/284 |
| 5,163,261 A | 11/1992 | O'Neill | 52/610 |
| 5,200,246 A | 4/1993 | Sabee | 428/109 |
| 5,220,762 A | 6/1993 | Lehnert et al. | 52/408 |
| 5,221,386 A | 6/1993 | Ensminger et al. | |
| 5,246,306 A | 9/1993 | Shoesmith et al. | |

| | | | | | |
|---|---|---|---|---|---|
| 5,267,816 A | 12/1993 | Mercer et al. ............... 405/258 | DE | 2127142 | 12/1971 |
| 5,308,692 A | 5/1994 | Kennedy et al. | DE | 2049 603 | 6/1972 |
| 5,316,561 A | 5/1994 | Roncato et al. | DE | 7806114 | 3/1978 |
| 5,319,900 A | 6/1994 | Lehnert et al. ............... 52/408 | DE | 2755879 | 6/1979 |
| 5,328,493 A | 7/1994 | Roncato et al. | DE | 2808723 | 9/1979 |
| 5,342,566 A | 8/1994 | Schafer et al. ............. 264/102 | DE | 3508933 A1 | 3/1985 |
| 5,342,680 A | 8/1994 | Randall ..................... 428/285 | DE | 39 21 779.5 | 1/1991 |
| 5,350,554 A | 9/1994 | Miller | DE | 3921779 | 1/1991 |
| 5,370,756 A | 12/1994 | Buis et al. ..................... 156/71 | DE | 3921779 A | 1/1991 |
| 5,371,989 A | 12/1994 | Lehnert et al. | EP | 67237 | * 12/1982 |
| 5,393,559 A | 2/1995 | Shoesmith et al. | EP | 0154094 | 2/1984 |
| 5,395,685 A | 3/1995 | Seth et al. .................. 428/283 | EP | 0 148 760 | 5/1985 |
| 5,397,631 A | 3/1995 | Green et al. ............... 428/219 | EP | 0 148 761 | 5/1985 |
| 5,401,588 A | 3/1995 | Garvey et al. | EP | 0 343 404 | 11/1989 |
| 5,419,092 A | 5/1995 | Jaecklin ....................... 52/562 | EP | 0343404 | 11/1989 |
| 5,425,796 A | 6/1995 | Loubinoux et al. | EP | 0343404 A | 11/1989 |
| 5,439,518 A | 8/1995 | Francis et al. | EP | 0637658 | 8/1995 |
| 5,451,355 A | 9/1995 | Boissonnat et al. | EP | 0 637 658 B1 | 12/1997 |
| 5,454,846 A | 10/1995 | Roncato et al. | ES | 2049272 | 4/1981 |
| 5,552,187 A | 9/1996 | Green et al. ............. 427/389.8 | GB | 772581 | 4/1957 |
| 5,552,207 A | 9/1996 | Porter et al. ................ 428/109 | GB | 1058957 | 2/1967 |
| 5,580,642 A * | 12/1996 | Okamoto et al. ............ 428/212 | GB | 1204541 | 9/1970 |
| 5,601,888 A | 2/1997 | Fowler | GB | 1520411 | 8/1978 |
| 5,637,362 A | 6/1997 | Chase et al. .................. 428/15 | GB | 2013 563 A | 12/1978 |
| 5,644,880 A | 7/1997 | Lehnert et al. ............... 52/408 | GB | 2004807 | 4/1979 |
| 5,704,179 A | 1/1998 | Lehnert et al. ............... 52/408 | GB | 1204541 | 9/1979 |
| 5,709,053 A | 1/1998 | Kuroda ........................ 52/145 | GB | 2 022 503 A | 12/1979 |
| 5,718,785 A | 2/1998 | Randall ........................ 156/39 | GB | 2023687 | * 1/1980 |
| 5,749,211 A * | 5/1998 | Kimura et al. ................. 57/217 | GB | 1 588 899 | 4/1981 |
| 5,753,368 A * | 5/1998 | Berke et al. ................. 428/375 | GB | 1588899 | 4/1981 |
| 5,763,043 A | 6/1998 | Porter et al. ................ 428/109 | GB | 1588899 A | 4/1981 |
| 5,772,846 A | 6/1998 | Jaffee | GB | 2 053 779 B | 5/1983 |
| 5,791,109 A | 8/1998 | Lehnert et al. ........... 52/309.17 | GB | 1588899 | 11/1989 |
| 5,891,374 A * | 4/1999 | Shah et al. .................. 264/108 | GB | 2225599 | 6/1990 |
| 5,945,182 A | 8/1999 | Fowler et al. | JP | 53-119344 | * 10/1978 |
| 5,981,406 A | 11/1999 | Randall | JP | 7-277777 | * 10/1995 |
| 6,001,496 A | 12/1999 | O'Haver-Smith | WO | WO 02/099217 A1 | 12/2002 |
| 6,001,935 A * | 12/1999 | Palmer, Jr. .................. 525/437 | | | |
| 6,054,205 A | 4/2000 | Newman et al. ............ 428/221 | | | |
| 6,171,984 B1 | 1/2001 | Paulson et al. | | | |
| 6,176,920 B1 * | 1/2001 | Murphy et al. .............. 106/711 | | | |
| 6,183,835 B1 | 2/2001 | Cho et al. | | | |
| 6,187,409 B1 * | 2/2001 | Mathieu ....................... 428/70 | | | |
| 6,254,817 B1 | 7/2001 | Cooper et al. | | | |
| 6,335,087 B1 | 1/2002 | Hourahane | | | |
| 6,391,131 B1 | 5/2002 | Newman et al. | | | |
| 6,481,171 B2 | 11/2002 | Yu et al. | | | |
| 6,579,413 B1 | 6/2003 | Grove | | | |
| 6,770,354 B2 | 8/2004 | Randall et al. | | | |
| 6,808,793 B2 | 10/2004 | Randall et al. | | | |
| 6,838,163 B2 | 1/2005 | Smith et al. | | | |
| 2002/0151240 A1 | 10/2002 | Smith et al. | | | |
| 2002/0170648 A1 | 11/2002 | Dinkel | | | |
| 2002/0182953 A1 | 12/2002 | Porter | | | |
| 2002/0182954 A1 | 12/2002 | Porter | | | |
| 2003/0051430 A1 | 3/2003 | Grove | | | |
| 2004/0084127 A1 | 5/2004 | Porter | | | |
| 2004/0150139 A1 | 8/2004 | Gregg et al. | | | |
| 2004/0209060 A1 | 10/2004 | McGrady et al. | | | |
| 2004/0224584 A1 | 11/2004 | Broadway | | | |

FOREIGN PATENT DOCUMENTS

| | | |
|---|---|---|
| CA | 721719 | 11/1965 |
| CA | 794590 | 9/1968 |
| CA | 993779 | 7/1974 |
| CA | 1029645 | 4/1978 |
| CA | 1189434 | 6/1985 |
| CA | 2006149 | * 6/1991 |
| DE | 1033133 | 6/1958 |
| DE | 1223287 | 8/1966 |
| DE | 1509853 | 4/1970 |
| DE | 2008744 | 9/1971 |

OTHER PUBLICATIONS

International Search Report from PCT/US01/00382 dated Apr. 12, 2001.
Office Action dated May 17, 2004 in U.S. Appl. No. 10/696,751.
Plastics Engineering Handbook, 4$^{th}$ ed., Joel Frados, Ed., p. 29, 1987.
Fehrer AG, The Dref 2 Friction Spinning Machine, technical brochure, pp. 1-27, 1993, Linz, Austria.
Fehrer AG, The Dref 2 Friction Spinning Machine, technical brochure, pp. 1-18, 1993, Linz, Austria.
Search Report from International Application PCT/US99/28931, dated Mar. 17, 2000.
Office Action dated Jan. 30, 2001 in U.S. Appl. No. 09/216,636.
Office Action dated Sep. 25, 2000 in U.S. Appl. No. 09/206,636.
Office Action dated Jun. 21, 2000 in U.S. Appl. No. 09/216,636.
Singh, "The effect of porosity on the properties of glass fibre-reinforced gypsum plaster", Journal of Materials Science 10 (1975) 1920-1928.
Reinhart, Engineered Materials Handbook, vol. 1, Composites, 1987 ASM International.
International Search Report in PCT/US04/01284 dated Sep. 1, 2004.
European Search Report in EP 01 93 9977 dated Feb. 25, 2003.
Notice of Allowance dated Dec. 23, 2004 in U.S. Appl. No. 09/844,058.
Office Action dated Mar. 15, 2004 in U.S. Appl. No. 09/844,058.
Office Action dated Jul. 31, 2003 in U.S. Appl. No. 09/844,058.
Office Action dated May 9, 2003 in U.S. Appl. No. 09/844,058.
Office Action dated Feb. 25, 2003 in U.S. Appl. No. 09/844,058.
Office Action dated Aug. 30, 2002 in U.S. Appl. No. 09/844,058.
Sto, Exterior Insulation Systems and Finishes, Trade Literature, 4 pages, Sep. 1982.
What Color Is Your Wall? R-wall™ Exterior Insulation and Finish System, Trade Literature, pp. 1-16, 1982.
Construction Dimensions, Ful-O-Mite™ IDS, H.B. Fuller Co., Trade Literature, 2 pages, Jul. 1983.

Owens Corning Fiberglas, Form Board, for "Poured-in-Place" Roof Decks, Trade Literature, pp. 1-8.
Amico, Metal Lath, Trade Literature, 1 page, no date.
Bestwall®, "Firestopper" poured-in-place Gypsum Roof Decks, Trade Literature, pp. 1-8, no date.
Neuhauser, Dr. Gerhard, Knauf Fireboard, pp. 2-11, Apr. 1984, with 1 page English translation.

Creed, Douglas, Construction Dimensions, "Mechanical Fastening: A Manufacturer's Response", pp. 31-34, Nov. 1985.
Paschal, Suzanne, Timber Products Inspection, Project No. 85-03, Report No. 4, pp. 1-10, Nov. 1985.

* cited by examiner

METHODS OF MAKING SMOOTH REINFORCED CEMENTITIOUS BOARDS

CROSS-REFERENCE TO RELATED APPLICATIONS

This application is a continuation of U.S. patent application Ser. No. 10/155,650 entitled METHODS OF MAKING SMOOTH REINFORCED CEMENTITIOUS BOARDS, filed May 23, 2002, now abandoned, which is a divisional of U.S. patent application Ser. No. 09/478,129 entitled SMOOTH REINFORCED CEMENTITIOUS BOARDS AND METHODS OF MAKING SAME, filed Jan. 5, 2000, now abandoned.

FIELD OF THE INVENTION

The present invention relates in general to reinforced products and in particular to reinforced cementitious boards for building construction and methods of making such boards.

BACKGROUND OF THE INVENTION

Dry wall or gypsum board is commonly used in the erection of interior walls in commercial, residential and other building structures. Dry wall is effective when used to enclose rooms subject to normal humidity and surface moisture conditions that occur in many of the rooms commonly found in offices, shops, residences and other buildings. However, bathrooms, basements and certain areas of residential and commercial kitchens may pose potential moisture problems for interior walls constructed from dry wall wallboard.

When dry wall is used in bathrooms, for example, tile may be adhered directly to the dry wall. Alternatively, some bathrooms utilize prefabricated modular stalls and/or bathtubs which may be adhered to the dry wall in the bathing areas of the room. Because hot baths and, especially, hot showers produce steam, bathrooms are frequently exposed to periods of very high humidity. Additionally, the basins and bathing areas thereof are susceptible to localized collection of surface moisture in the form of small pools or puddles of water. If cracks are present in the tile grout or if the seams between the dry wall and the basins or prefabricated bathing area components are not completely sealed, the steam or puddled surface water may come into contact with the dry wall.

The opposed faces of dry wall are typically covered with paper which is suitable for receiving paints, primers and tile adhesives. However, such paper also has a tendency to absorb water. As the water is absorbed by the paper, it comes into contact with the gypsum core of the dry wall. Gypsum is a hygroscopic material. The gypsum core therefore absorbs moisture that passes through the facing paper. Over the course of time the level of water absorption may degrade the structural integrity of the dry wall board. If the water damage becomes excessive, some or all of the board may require replacement, which may be an especially laborious task in the bathing areas of a bathroom.

Because they are effectively immune to water damage, cementitious boards have been employed as alternatives to dry wall in particularly humid and wet rooms. Cementitious boards may be fabricated to assume essentially the same dimensions and weight, as well as support the same sorts of facing materials, as conventional dry wall. As is known, concrete and similar cementitious materials have far greater compressive strength than tensile strength. This phenomenon mandates that cementitious boards and similar, relatively thin, panel-like cementitious objects be handled with care during transport. More specifically, unless sufficiently reinforced such boards must be carried substantially vertically, i.e., with their opposed faces extending substantially perpendicularly to the ground or floor surface. This is especially true in the case of approximately ¼ inch thick boards that are typically laid over a plywood or particle board substrate and used to provide a smooth backing for receiving vinyl, tile or other flooring or countertop coverings. If carried substantially horizontally, i.e., with the opposed board faces extending substantially parallel to the ground surface such as would occur if opposite end edges or opposite side edges of the board are supported by two or more workers, the material in the upper regions of the board (in the thickness dimensions of the board) would be in compression and the material in the lower regions of the board would be in tension. If the tensile forces exceed the tensile strength of the cementitious material, the board may snap during transport. Alternatively, although less overtly catastrophic, radiant cracking may occur in the lower regions of the board which may preclude its installation or, if installed, might greatly comprise its bearing capacity and service life. Moreover, reinforcement should be of sufficient durability that it continues to strengthen and toughen the board over the typical projected 2040 year service life of the board.

Various means have been proposed for reinforcing cementitious boards. Typically, the reinforcement comprises an open grid structure whose central plane is embedded approximately 1/32 to 1/16 inch beneath each face of the ordinarily ½ to ⅝ inch thick wall board or the ¼ inch backing board for vinyl, tile or other flooring or countertop coverings. For example, open mesh woven polypropylene has been used for this purpose because of its resistance to water and the alkaline chemistries of Portland cement concrete and similar cementitious materials. However, because of the comparatively low modulus of elasticity of polyolefins such as polypropylene and polyethylene, which is on the order of about 10,000 to about 75,000 psi, such materials experience high strain under the tensile loads which can occur due to improper handling of the cementitious board. As tensile reinforcement, therefore, polypropylene grids are of limited practical use.

High modulus of elasticity materials have also been proposed for use as reinforcement for building panels. U.S. Pat. Nos. 5,552,207 and 5,763,043, for example, describe wall facings comprising an open grid, resin impregnated, fiberglass fabric which is affixed to a rigid foam insulation board and covered by and embedded within stucco or stucco-like material. The wall facing may be prepared either in situ on the outside of a building or in the form of prefabricated panels which may be bonded to a building wall. The wall facing, including the prefabricated panel embodiments thereof, is attached to a pre-existing wall and is not itself used as a wall panel in the manner, for example, of dry wall or the cementitious boards of the present invention. Indeed, the wall facing may be affixed to dry wall or cementitious boards but cannot be used in lieu thereof because of the low bending strength of its plastic foam backing board. A wall constructed solely of such facing would likely be destroyed as a result of minor impacts there against, including the sorts of impacts routinely absorbed by dry wall and cementitious wall panel boards. Because of the rough-textured finish and thorough coverage afforded by the stucco material, comparatively heavy and inexpensive fiberglass yarns arranged at an average of 3 to 10 ends per inch are used for the rovings or yarns.

As noted hereinabove, the reinforcement provided in existing cementitious boards is typically embedded just beneath each face of the boards. By locating the reinforcement so close to the surface of the board faces, the tensile stress transfer from the concrete to the reinforcement is optimized. It is the concrete material which is closest the board faces, i.e., the "skin" concrete, that is potentially subject to the greatest tensile forces and, therefore, in greatest need of tensile stress relief due to improper handling of the board. If reinforcement is embedded much more deeply than about 1/16 inch beneath the board faces, the reinforcement becomes situated too close to the neutral axis of the board. Hence, the flexural modulus of the board is thus reduced, and the board becomes more flimsy and prone to surface cracking. By maintaining the reinforcement close to the board faces, the board is stiffened in much the same way that the parallel flanges strengthen an I-beam.

Vinyl coated glass fiber mesh is disclosed as a reinforcement for cementitious boards in U.S. Pat. Nos. 4,793,892 and 4,816,091. Relatively light and heavy weight glass fabrics are disclosed as alternative reinforcement materials. For instance, somewhat heavy 8×8 or 10×10 yarn per inch fiberglass meshes are disclosed in one embodiment to provide openings of a size sufficient to permit passage of the board's cementitious core material and thereby enable good mechanical interlock between the reinforcement and the core material. From an aesthetic perspective, comparatively thick, open 8×8 or 10×10 yarn per inch fiberglass reinforcement meshes produce a rough board face. For consumers who desire smooth wall surfaces for painting, papering, tiling and the like, the peaks and valleys produced by such fabrics, especially at the warp and weft strand intersections, would be unacceptable. These patents also disclose another embodiment wherein lighter weight 20×12 or 16×12 glass fiber woven mesh may be used as the reinforcement. This alternative, although presenting a smoother board face, nevertheless is very expensive because lighter fiberglass yarns are more costly per pound and tighter fabrics require more time and cost to produce than board reinforced with heavier fabrics.

Cellulose reinforced cementitious boards having smooth surfaces are also known. However, these building products exhibit less structural strength and water and alkali resistance than cementitious boards reinforced with high modulus materials such as suitably coated glass fiber or the like.

A need exists, therefore, for high modulus reinforcement for cementitious boards and similar construction panels which is highly resistant to alkali and water attack, comparatively low in cost and allows one or both of the board's oppositely facing surfaces to have a smooth finish suitable for painting, papering, tiling or other decorative treatment.

Further advantages exist for reliable methods for manufacturing such reinforcement, boards incorporating the reinforcement and methods for manufacturing such boards.

SUMMARY OF THE INVENTION

The present invention provides a composite fabric for use in reinforcement of cementitious boards and similar prefabricated building wall panels. The composite fabric comprises a continuously coated, high modulus of elasticity mesh first component and a nonwoven second component. The high modulus strands of the first component preferably comprise glass fibers encapsulated by alkali and water resistant polymer and arranged at no greater than about 15 ends per inch in the machine and cross-machine directions of the material. The nonwoven second component is preferably a thin web of randomly oriented, water and alkali resistant fibers. The composite fabric is relatively easy and inexpensive to manufacture and incorporate into cementitious boards. Significantly, it has physical characteristics that enable its embedment within the cement matrix of the panels or boards closely adjacent one or both of the opposed faces thereof to provide the boards with smooth outer surface(s) suitable for painting, papering, tiling or other decorative finishing treatment. The fabric provides long-lasting, high strength tensile reinforcement of the panels or boards regardless of their spatial orientation during handling and use. The reinforcement also enhances the impact resistance of the boards after installation.

Included as part of the invention are methods for making the reinforcement, cementitious boards and panels including the reinforcement, and methods for manufacturing such boards and panels.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
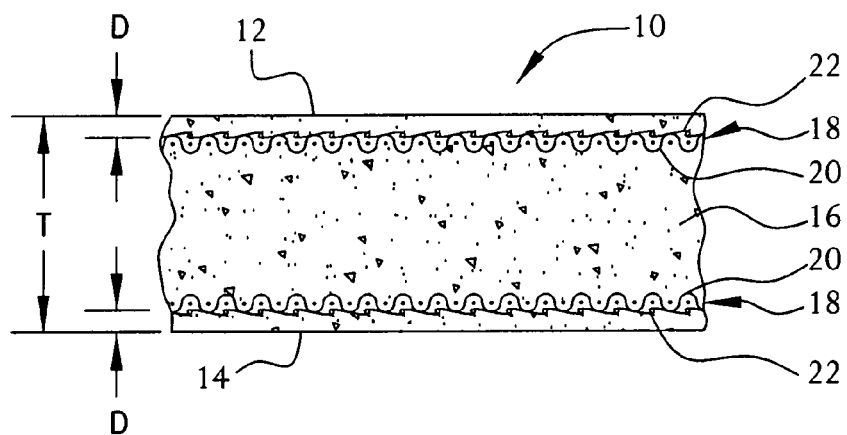
FIG. 1 is a cross-sectional view through the thickness of a cementitious board constructed in accordance with the present invention.

Referring initially to FIG. 1, there is shown a cementitious board or panel 10 constructed according to the present invention. Board 10 is substantially planar and has opposed faces 12 and 14 and thickness "T" typically of about ½ inch to about ⅝ inches for wall boards, although boards as thin as ¼ inch may be constructed for use primarily as backing for tile, vinyl or other floor or countertop coverings. Board 10 may be manufactured to any peripheral or areal dimensions, e.g., the eight-foot length by four-foot width common to dry wall boards. At the job site board 10 may be cut to any desired size or shape by hand by scoring and snapping the scored edge, or by a power saw.

Board 10 comprises cementitious matrix material 16 such as Portland cement concrete or other hydraulic concrete which is reinforced near at least one or, more preferably, both of opposed faces 12 and 14 with reinforcement 18 constructed in accordance with the present invention. It is especially advantageous to reinforce board 10 adjacent both of faces 12 and 14. In that way, should the board 10 be carried by workers in the generally horizontal disposition of FIG. 1, i.e., with the opposed board faces 12, 14 extending substantially parallel to the ground or floor surface, there will be high modulus tensile reinforcement in the cementitious matrix material 16 in the lower regions of the board 10 regardless of whether face 12 or face 14 is downwardly directed toward the ground or floor surface Additionally, reinforcement disposed closely adjacent the faces of the board maximizes the flexural strength of the board when in service. To optimize the tensile reinforcement capabilities of reinforcement 18 and avoid spalling of the skin concrete adjacent faces 12 and 14, the central plane of fabric 18 should be embedded a depth "D" of about 1/32 to 1/16 inch from face(s) 12,14.

Reinforcement 18 is a composite fabric comprising a first component 20 and a second component 22. First component 20 may be a woven knit or a laid scrim open mesh material having mesh openings of a size suitable to permit interfacing between the skin and core cementitious matrix material 16 of board 10. According to a presently preferred construction, first component 20 can assume, for instance, a grid-like configuration having a strand count of between about 2 to about 15 strands per inch in each direction, preferably about 4 to about 10 strands per inch. The mesh of first component 20 is preferably comprised of yarns or rovings having high modulus of elasticity core strands impregnated and preferably sheathed by a coating of water and alkali-resistant polymer coating. The yarns or rovings of first component 20 preferably comprises a bundle of fibers having a Young's modulus of elasticity of at least about 1,000,000 psi such as polyamide fibers of poly(p-phenylene terephthalamide), known as KEVLAR®. More preferably, the rovings of first component 20 comprise a bundle of continuous filament "E" or "C" glass fibers having a linear density of about 33 to about 300 tex. Because of the presence of water and alkali in cementitious environments, glass fibers or similar glass core strand materials, in the absence of a protectant coating or sheathing, would fail in weeks or months rather than the 20 to 40 year service life that is required for practical deployment of a cementitious board. The coating may be provided by any suitable process heretofore known in the art and does not form a part of the present invention.

For instance, the coating may be a continuous coating of water and alkali-resistant polymeric material which may be applied by any conventional spray or dip-coating procedures. Alternatively, the coating may be co-extruded with the rovings of the first component 20 in a manner similar to that described in U.S. Pat. No. 5,451,355. By co-extruding a sheath with the rovings of the first component 20, the core strand is continuously coated at the moment of its manufacture.

Preferred sheath materials for the sheath or coating include, without limitation, olefins, polyolefins and olefin copolymers such as polypropylene and polyethylene, copolymers of polybutylene and propylene, ethylene propylene rubber (EPR), thermoplastic polyolefin rubber (TBR), polyvinyl chloride compounds, polyvinylidene chloride (SARAN®), ethylene-propylene diene monomer (EPDM) and copolymers of styrene and butadiene (SBR).

When constructed as a co-extruded yarn, the yarns of the first component 20 may be woven, knitted or cross-laid by any known techniques to produce a desired open mesh. Following formation of the desired mesh from the yarns, the mesh may be heated to a temperature to fuse thermoplastic sheaths of intersecting yarns at the intersection areas thereof to affix and stabilize the yarns within the fabric. Alternatively, the yarns of the mesh fabric first component 20 may be stitched, adhesively attached or otherwise attached at their intersection areas by any suitable technique known in the art.

Another yarn or roving useful in the formation of the mesh first component 20 includes a core strand of high modulus fibers identical or similar to those mentioned above. Unlike the previously described sheath, however, which provides a continuous, imperforate coating of the core strand at the moment of manufacture, the alternative sheath is preferably constructed as a fibrous covering which is spun or otherwise wrapped about the core strand. Suitable apparatus for fabricating such a yarn or roving include the DREF-2 and DREF-3 friction spinning apparatus manufactured by Fehrer AG of Linz, Austria.

The DREF-3 apparatus is preferred because the yarn produced thereby comprises a fibrous core sliver commingled with a core strand and covered by sheath. The core sliver may comprise any suitable thermoplastic material including, without limitation, either isotactic or syndiotactic polypropylene, ethylene-propylene copolymers or other olefinic fibers, nylon, polyvinyl chloride, or polyester, although polyolefins are preferred because of the physical durability and alkali resistance. Hence, because of its intimate contact with the core strand, the core sliver provides the core strand with alkali resistance and ruggedness generally superior to core strands covered merely with sheath. The sheath is preferably fabricated from thermoplastic fibrous materials the same as or similar to either the core sliver or the sheath materials of the co-extruded yarn described hereinabove.

By virtue of its fibrous nature, the sheath of a yarn or roving produced by the DREF-3 apparatus is not entirely imperforate and thus possesses some pores which extend the outer periphery of the yarn to the core strand. However, the composite yarn is substantially more supple and flexible than the previously described co-extruded yarn and may be more readily woven, knitted or cross-laid into a desired open mesh structure. Following formation, the mesh is heated to a temperature sufficient to fuse or sinter the fibers of the sheath such that they merge into an agglomerated, continuous, imperforate mass encapsulating the core strand. Concurrently, the rovings or yarns become fused at their intersections.

Although not illustrated, alternative mesh first components 20 are contemplated to be within the scope of the present invention. For example, a suitable mesh may incorporate co-extruded composite yarns in the warp or machine direction of the fabric and fiber covered composite yarns or rovings may be provided in the weft or cross-machine direction of the fabric, or vice versa. Thereafter, the "mixed" yarns may be heated after mesh formation to produce a reinforcement structure of continuously coated and united high modulus strands.

Second component 22 is a thin, porous, nonwoven material preferably fabricated from randomly oriented fibers of water and alkali resistant, preferably thermoplastic, material. Although thermoplastics are preferred, non-thermoplastic cellulosic fibers such as cotton, rayon, ramie, flax, sisal, hemp or wood pulp may also be used. While cellulosic fibers may not have optimum alkali resistance, they are hydrophilic and thus reduce or eliminate the need for the wetting or adhesion enhancing treatments described below. Water and alkali resistant thermoplastics are preferred, however, because of their superior ability to withstand the high alkalinity of hydraulic concretes and long-term exposure to moist environments. Although nylons and polyesters may be used, preferred thermoplastics suitable for use as second component 22 include spunbonded or carded webs of olefins, polyolefins and olefin copolymers such as polypropylene and polyethylene, copolymers of polybutylene and propylene, ethylene propylene rubber (EPR), thermoplastic polyolefin rubber (TBR), polyvinylidene chloride (SARAN®) and ethylenepropylene diene monomer (EPDM).

The first and second components 20, 22 of composite fabric reinforcement may be stitched, adhesively fixed, heat fused or otherwise united with one another by any means or methods commonly employed in the art. For instance, web second component 22 may be coated on one side with a conventional inexpensive water-based glue and then brought into contact with the mesh first component 20. Light to moderate heat and/or pressure may be used to quicken and enhance the bonding process. Alternatively, especially when at least one of the first and second components 20, 22 contains a thermoplastic, the second component may be fused with the first component 20 either during or after the grid coating and intersection fixing heating steps described above. Still further, the first and second components may be united with one another using known insertion methods and apparatus whereby the web 22 becomes integrated into the mesh 20, or vice versa. In the case where composite fabric reinforcement 18 is constructed as abutting layers, second component 22 should be the outermost layer as depicted in FIG. 1.

In development of the present invention, it has been observed that the surface finish and integrity of a cementitious 30 board incorporating composite fabric reinforcement 18 are considerably improved if at least one or, more preferably, both the first component 20 and second component 22 are treated in a manner so as to enhance at least one of the wetting and adhesion characteristics thereof. Such treatment may be performed before or after the first and second components 20,22 are united. Treatments may include corona or electrical discharge treatments to oxidize the surfaces of the first and/or second components. Alternatively, the first and/or second components may be coated with one or more surfactants, hydrophilic compounds, foam boosters/stabilizers and polar polymer topical solutions such as polyvinyl alcohol to enhance adhesion and promote continuity of cement slurry about the reinforcement when the reinforcement is later embedded in cementitious matrix material.

In addition, cement powder may be slurried with one or more hydrophilic additives, wetting agents, foaming agents and foam boosters and applied to either or both of the first and second components 20,22. Following application, the coated reinforcement is immediately dried to prevent significant reaction of the cement with water (i.e., hydrating) that might otherwise cause the reinforcement to stiffen and resist rolling. A polymer may also be included in the slurry to assure that the cement powder remains bound to the reinforcement fibers and does not flake off after drying. An advantage to this type of pretreatment is that it imbues the reinforcement with cementing properties and avoids the need to pretreatment of the reinforcement with cement slurry on the cement board assembly line.

If desired, the nonwoven web second component 22 may be fabricated from loose fibers that are joined by a chemical binder. Depending on the composition or nature of the fibers, e.g., carded webs, the fibers and the binder chosen to join the fibers may have varying degrees of hydrophilicity. Thus, selection of appropriate fibers and/or hydrophilic binder may reduce or even eliminate the need for subsequent wetting and adhesion enhancing treatments on the second component 22.

The comparatively open mesh first component 20 and nonwoven web second component 22, when united and embedded in a cementitious board promote penetration of cement slurry yet resist pin-holes or roughness which would mar the board faces 12, 14. Additionally, while employing two distinct fabrics, composite fabric reinforcement 18 is less expensive to manufacture than a single denser mesh of lighter weight glass yarns, e.g., about 20×20 ends per inch, that would be needed to produce comparable slurry penetration and board surface smoothness.

Figure 2:
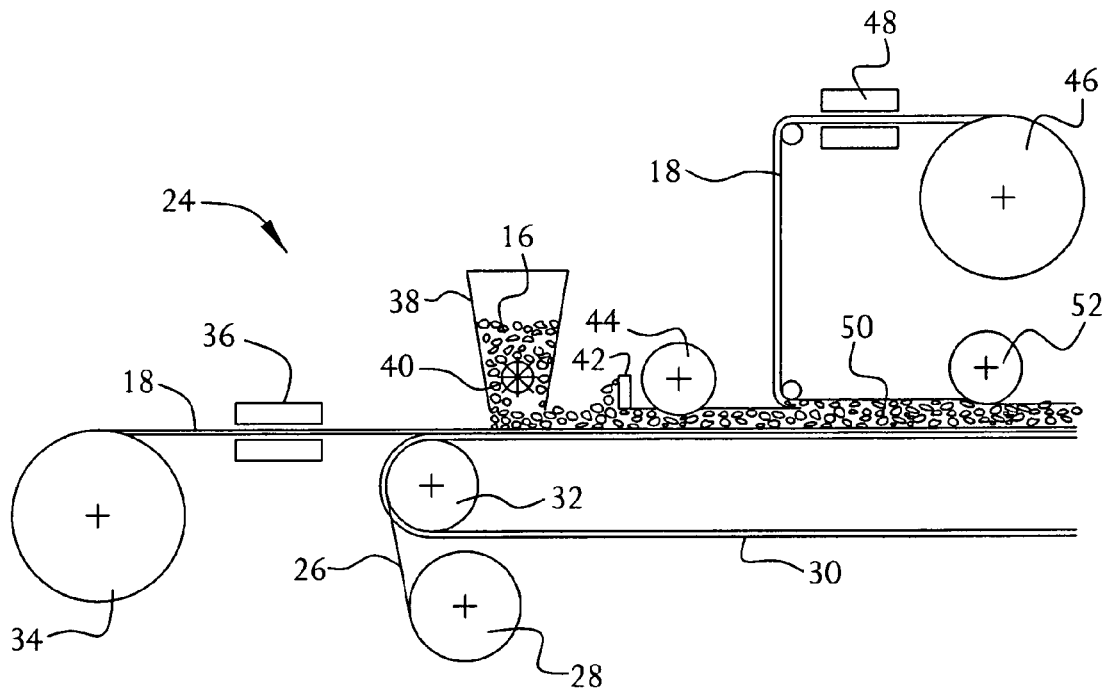
FIG. 2 is a schematic elevation view of an apparatus suitable for constructing a cementitious board according to the present invention.

Referring to FIG. 2, there is shown an apparatus 24 suitable for manufacturing a reinforced cementitious board having the general construction of board 10 shown in FIG. 1. Apparatus 10 is operable for continuous production of a cementitious ribbon or strip suitable for cutting into individual panels or boards of desired length. Apparatus 24 dispenses a continuous length of carrier or release paper 26 from a spool, roll or similar supply 28 onto a moving endless conveyor belt 30 entrained about a roller 32 and second unillustrated roller at least one of which is rotatably driven. A first continuous length of composite fabric reinforcement 18 according to the present invention is simultaneously dispensed from a spool, roll or similar supply 34 and delivered to conveyor belt 30. The carrier paper 26 supports the first length of reinforcement 18 as it is drawn through apparatus 24 by conveyor belt 30.

As an alternative to treating one or both of the first and second components 20, 22 of reinforcement substantially at their time of manufacture, such components may be treated to enhance their wetting and adhesion characteristics as an in-line step of the reinforced board manufacturing process. That is, as indicated in FIG. 2, reinforcement 18 may first be sprayed or treated at a suitable pretreatment station 36 at which preferably both sides of the reinforcement are treated to enhance the wetting and/or adhesion characteristics thereof. Treatment at station 36 may include any of the corona or electrical discharge treatments or surfactant, hydrophilic compound, foam booster/stabilizer or polar polymer topical coating processes enumerated above.

Upon reaching the conveyor belt 30, reinforcement 18 is moved by the belt under a hopper 38 where cementitious matrix material 16 is discharged onto the reinforcement by known means such as a rotating dispensing device 40. The matrix material is then spread into a uniform layer as it passes under screed means 42 and, preferably vibrating, compaction roller 44 and between unillustrated side rails. Although not illustrated, it will be understood that, if necessary, reinforcement 18 may first be passed through hydraulic cement slurry to assure good penetration of the reinforcement 18 with the slurry prior to receipt of the cementitious matrix material.

The process thus far described would be sufficient for embedding reinforcement 18 adjacent one of the faces 12, 14 of board 10 (FIG. 1). However, it is normally desirable to reinforce a cementitious board adjacent both its faces. Accordingly, a second continuous length of composite fabric 18 may be deposited on the mass of cementitious matrix material 16 following compaction by roller 44. The second length of fabric 18 may be dispensed from a second spool, roll or similar supply 46. If desired, the fabric dispensed from supply 46 may be treated at a treatment station 48 preferably identical or substantially similar to station 36 to enhance the wetting and adhesion characteristics thereof. Additionally, the second length of composite reinforcement 18 may also be passed through hydraulic cement slurry to assure good penetration of the reinforcement with the slurry prior to placement of the reinforcement onto the uncured matrix material 16. Following placement of the second length of reinforcement 18, the moving strip 50 is desirably compacted by a second, preferably vibrating, compacting roller 52. The uncured, reinforced cementitious strip can then be cut by unillustrated means into individual boards or panels and stacked for curing. In the alternative, apparatus 24 may include an in-line curing station for hardening the strip 50 after which the cured strip may be cut into boards 10 (FIG. 1).

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A method of making a reinforced smooth cementitious board having a cement skin adjacent to an outer face, comprising:
  (a) depositing a reinforcement fabric and a layer of hydraulic cementitious material, one on the other, wherein the reinforcement fabric comprises an open mesh united with a thin, porous nonwoven web;
  (b) prior to depositing the reinforcement fabric and the layer of hydraulic cementitious material one on the other, applying a slurry having a cement powder and one or more of, hydrophilic additives, wetting agents, foaming agents and foam boosters to either or both of the open mesh and the thin, porous nonwoven web, and drying the slurry;
(c) penetrating the open mesh with the layer of hydraulic cementitious material and imbedding the open mesh in the layer of hydraulic material;
(d) promoting penetration through the thin, porous nonwoven web by a portion of the layer of hydraulic cementitious material to form the cement skin adjacent to the outer face by having the thin, porous nonwoven web comprise alkali resistant polymer fibers coated with a hydrophilic material;
(e) penetrating through the thin, porous nonwoven web by said portion of the layer of hydraulic cementitious material to form the cement skin adjacent to the outer face and embed the thin, porous web in the layer of hydraulic cementitious material at a depth from the outer face; and
(f) curing the layer of hydraulic cementitious material to form a layer of hardened cementitious material imbedding the open mesh and the thin, porous nonwoven web at a depth from the outer face, wherein a portion of the layer of hardened cementitious material comprises the cement skin adjacent to the outer face.

2. The method of claim 1, wherein the open mesh comprises glass fibers sheathed with alkali resistant material and the sheathed fibers are fused together at intersections of the open mesh.

3. The method of claim 1, comprising forming the open mesh by wrapping glass fibers with fibers of an alkali resistant material and applying heat to fuse the fibers of the alkali resistant material to provide sheathed glass fibers sheathed by the alkali resistant material, and joining the sheathed glass fibers at intersection areas thereof within the open mesh.

4. The method of claim 1, wherein the nonwoven web is a spunbonded web.

5. The method of claim 1, wherein the open mesh comprises glass fibers sheathed with alkali resistant material and the sheathed fibers are fused together at intersections of the open mesh, and wherein the nonwoven web is a spunbonded web.

6. A method of making a reinforced smooth cementitious board having a cement skin adjacent to an outer face, comprising:
(a) depositing a layer of hydraulic cementitious material onto a reinforcement fabric thereby depositing one on the other, wherein the reinforcement fabric comprises an open mesh united with a thin, porous nonwoven web;
(b) prior to depositing the layer of hydraulic cementitious material onto the reinforcement fabric, applying a slurry having a cement powder and one or more of, hydrophilic additives, wetting agents, foaming agents and foam boosters to either or both of the open mesh and the thin, porous nonwoven web, and drying the slurry;
(c) penetrating the open mesh with the layer of hydraulic cementitious material and imbedding the open mesh in the layer of hydraulic cementitious material;
(d) promoting penetration through the thin, porous nonwoven web by a portion of the layer of hydraulic cementitious material to form the cement skin adjacent to the outer face by having the thin, porous nonwoven web comprise alkali resistant polymer fibers coated with a hydrophilic material;
(e) penetrating through the thin, porous nonwoven web by said portion of the layer of hydraulic cementitious material to form the cement skin adjacent to the outer face and embed the thin, porous web in the layer of hydraulic cementitious material at a depth from the outer face;
(f) curing the layer of hydraulic cementitious material to form a layer of hardened cementitious material imbedding the open mesh and the thin, porous nonwoven web at a depth from the outer face, wherein a portion of the layer of hardened cementitious material comprises the cement skin adjacent to the outer face; and
(g) compacting the layer of hydraulic cementitious material and the reinforcement fabric.

7. A method of making a reinforced smooth cementitious board having a cement skin adjacent to an outer face, comprising:
(a) depositing a reinforcement fabric onto a layer of hydraulic cementitious material thereby depositing one on the other, wherein the reinforcement fabric comprises an open mesh united with a thin, porous nonwoven web;
(b) prior to depositing the reinforcement fabric onto the layer of hydraulic cementitious material, applying a slurry having a cement powder and one or more of, hydrophilic additives, wetting agents, foaming agents and foam boosters to either or both of the open mesh and the thin, porous nonwoven web, and drying the slurry;
(c) penetrating the open mesh with the layer of hydraulic cementitious material and imbedding the open mesh in the layer of hydraulic material;
(d) promoting penetration through the thin, porous nonwoven web by a portion of the layer of hydraulic cementitious material to form the cement skin adjacent to the outer face by having the thin, porous nonwoven web comprise alkali resistant polymer fibers coated with a hydrophilic material;
(e) penetrating through the thin, porous nonwoven web by said portion of the layer of hydraulic cementitious material to form the cement skin adjacent to the outer face and embed the thin, porous web in the layer of hydraulic cementitious material at a depth from the outer face;
(f) curing the layer of hydraulic cementitious material to form a layer of hardened cementitious material imbedding the open mesh and the thin, porous nonwoven web at a depth from the outer face, wherein a portion of the layer of hardened cementitious material comprises the cement skin adjacent to the outer face; and
(g) compacting the reinforcement fabric and the layer of hydraulic cementitious material.

* * * * *